(12) United States Patent
Bone

(10) Patent No.: US 6,273,483 B1
(45) Date of Patent: Aug. 14, 2001

(54) THREE ORTHOGONAL DIRECTIONS MOVABLE FINGERS FOR HOLDING AND/OR MANIPULATING A THREE-DIMENSIONAL OBJECT

(75) Inventor: Gary M. Bone, Hamilton (CA)

(73) Assignee: McMaster University, Hamilton (CA)

( * ) Notice: Subject to any disclaimer, the term of this patent is extended or adjusted under 35 U.S.C. 154(b) by 0 days.

(21) Appl. No.: 09/208,995

(22) Filed: Dec. 11, 1998

Related U.S. Application Data

(63) Continuation-in-part of application No. 08/824,721, filed on Mar. 26, 1997, now abandoned.
(60) Provisional application No. 60/014,434, filed on Mar. 28, 1996.

(51) Int. Cl.$^7$ ........................................... B25J 15/10
(52) U.S. Cl. ........................... 294/86.4; 294/88; 294/93; 294/119.1
(58) Field of Search .............................. 294/15, 16, 27.1, 294/34, 86.4, 88, 93–97, 103.1, 106, 115, 119.1, 902; 269/156; 414/941; 901/16, 23, 31, 36–39

(56) References Cited

U.S. PATENT DOCUMENTS

| | | | |
|---|---|---|---|
| 3,901,577 | * | 8/1975 | Skinner ............................... 294/97 X |
| 4,367,893 | * | 1/1983 | Berg .................................. 294/86.4 X |
| 4,598,942 | * | 7/1986 | Shum et al. ........................... 294/106 |
| 4,616,971 | * | 10/1986 | Matrone ............................ 294/86.4 X |
| 4,623,183 | * | 11/1986 | Aomori ............................. 294/106 X |
| 4,651,440 | * | 3/1987 | Karl ................................. 294/115 X |
| 4,653,793 | | 3/1987 | Guinot et al. ........................ 294/86.4 |
| 4,790,709 | * | 12/1988 | Sakimori et al. .................. 294/93 X |
| 4,813,732 | * | 3/1989 | Klem ................................. 294/103.1 |
| 4,828,276 | * | 5/1989 | Link et al. ........................... 294/106 |
| 4,976,484 | * | 12/1990 | Nomaru et al. .................... 294/119.1 |
| 5,052,736 | * | 10/1991 | Loncaric et al. ..................... 294/106 |
| 5,161,846 | * | 11/1992 | Yakou .................................. 294/106 |
| 5,161,847 | * | 11/1992 | Yakou .............................. 294/86.4 X |
| 5,178,431 | | 1/1993 | Voellmer ............................. 294/86.4 |
| 5,520,501 | * | 5/1996 | Kouno et al. ................. 294/119.1 X |
| 5,566,466 | * | 10/1996 | Hearne ............................. 294/106 X |
| 5,669,652 | * | 9/1997 | Reising et al. ...................... 294/97 X |

OTHER PUBLICATIONS

Proceedings of the 24$^{th}$ International Symposium on Industrial Robots, Tokyo, Nov. 4–6, 1993.
Flex–Tool A Tool for Body Shop Flexibility, James Kosmala, IBEC 94, Body Assembly & Manufacturing, pp. 87–94 inc.
Developing a flexible automated fixturing device, Karl Kurz et al, Mechinaical Engineering Jul. 94 pp. 59–63 inc.
An Update on Nissan Intelligent Body Assembly System, Abe et al, IBEC Oct. 31–Nov. 2, 1995, pp. 1–7 inc.
Flexible Grippers for Mechanical Assembly , Baartman and Storm, (5 pages) Industrial Robot vol. 21 No. 1 1994.
Various grippers (8 in total, product information sheets/catalog pages), No Date.
Programmable Robot Gripper for Accurately Fixturing Three–Dimensional Sheet Metal Parts (3 pages) , No Date.

* cited by examiner

Primary Examiner—Johnny D. Cherry
(74) Attorney, Agent, or Firm—Freedman & Associates

(57) ABSTRACT

A robotic gripper for fixturing and manipulating a sheet of substantially rigid material, e.g. a sheet metal part, has three fingers with circumferential grooves thereon. Each of the fingers has three degrees of movement. The sheet metal part has at least one opening of a size suited to accommodate one of the fingers. The other fingers can engage the edges of other openings in the sheet metal part or the outside edge of the part. The fingers can be moved away from each other or towards each other respectively depending on the positioning of the fingers, whereby the sheet metal part is fixtured by means of the grooves of the fingers. By using three fingers each having three degrees of movement, and having grooves thereon, an object can be held and kinematically locked without the application of force.

16 Claims, 12 Drawing Sheets

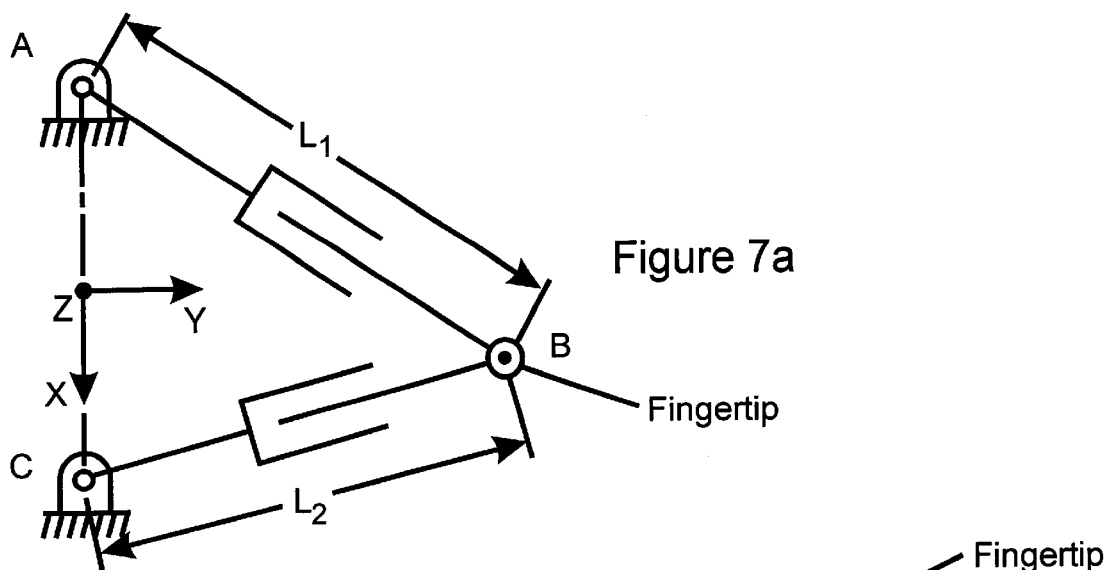
Figure 7a
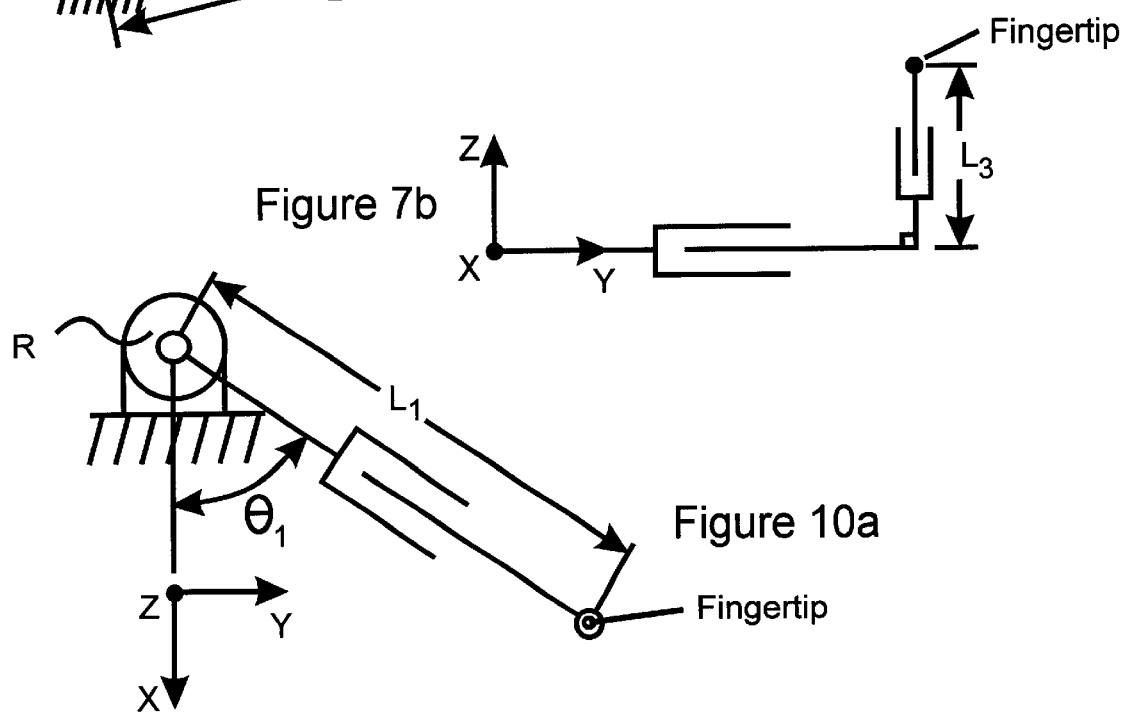
Figure 7b
Figure 10a
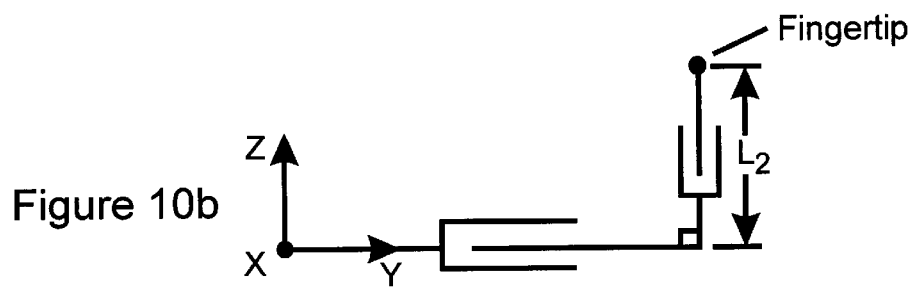
Figure 10b

THREE ORTHOGONAL DIRECTIONS MOVABLE FINGERS FOR HOLDING AND/OR MANIPULATING A THREE-DIMENSIONAL OBJECT

This application is a Continuation-in-Part Application of U.S. application Ser. No. 08/824,721 filed Mar. 26, 1997, now abandoned, which claims priority from U.S. Provisional Patent Application Serial No. 60/014,434 filed Mar. 28, 1996.

FIELD OF THE INVENTION

This invention relates generally to robotic grippers and more particularly to a gripper and method of gripping and/or manipulating a sheet material.

BACKGROUND OF THE INVENTION

Many gripping means are known to be used with various tools or for gripping, holding and moving objects, and particularly as a terminal organ of a manipulator or programmed robot. Most often, these grippers make broad surface contact with the objects to be gripped. Alternatively, smaller pads on fingers are used and an object is held by forcing the fingers and pads in an inward direction against the outer surface of the object.

In some instances grippers are provided with two fingers which do the gripping either while parallel to one another, or while pivoting about two shafts affixed to a base piece. These two fingers generally terminate in planar, in some cases resilient, contact surfaces, permitting ordinary objects to be held immobile by making broad surface or linear contact on each surface.

U.S. Pat. No. 4,653,793 in the name of Guinot et al. describes a gripper having a plurality of contact pads providing a point contact with an object to be gripped. In operation, when an object is to be gripped, the pads apply an inward force on the outside surface of the object.

Another robotic gripper is described in U.S. Pat. No. 5,178,431 in the name of Voellmer, the gripper including a pair of fingers movable toward and away from one another while the fingers remain parallel to each other.

U.S. Pat. No. 4,367,893 in the name of Berg and U.S. Pat. No. 4,828,276 in the names of Link et al. disclose grippers whose fingers only move in a plane, whose finger axes must be parallel to the surface of the part in order to hold it, and which withstand out-of-plane forces and moments by means of contact friction alone. In contrast to the present invention, these devices are unable to grasp parts whose surfaces are not parallel, or hold parts subject to large out-of-plane forces or moments (e.g. due to part weight).

U.S. Pat. No. 5,566,466 in the name of Heane and U.S. Pat. No. 5,669,652 in the name of Reising et al. describe grippers designed for holding flat sheet objects. Each device may only move its fingers in a plane and as a result is limited to holding flat, or nearly flat, sheet objects.

U.S. Pat. No. 5,161,847 in the name of Yakou describes a gripper with three plain, pin-like elongate cylindrical fingers. One finger has two degrees of mobility, while the remaining two fingers share four degrees of mobility, for a total of six degrees of mobility. To position each of the fingers of a three finger gripper anywhere in 3D space, as is required to provide the flexibility to hold many objects, requires a total of nine degrees of mobility. The device of Yakou has the limitation that in order to place the fingers at any point in space requires the use of three degrees of mobility from the robot holding the gripper. This is undesirable for at least two reasons. Firstly, not all robots may possess the needed degrees of freedom. Secondly, the larger mass carried by the robot's actuators will cause their movements to be slow when compared to a gripper's actuators.

In accordance with an aspect of this invention three fingers are provided each having three degrees of mobility X, Y and Z; this provides the ability to position each finger anywhere in 3D space only restricted by the size of the device; furthermore, the gripper in accordance with an aspect of the invention does not require any degrees of mobility from the robot. In fact, the gripper could be mounted on a stationary platform and still could be used to the pickup, hold, transport, and drop-off objects with a wide variety of shapes.

The gripper described by Yakou in U.S. Pat. No. 5,161, 847 is further limited by the plain cylindrical fingers employed. As with the devices of Link et al. and of Berg, out-of-plane forces and moments are resisted by means of contact friction alone. For example, a typical application is shown in FIG. 11 of the instant invention, similar to FIG. 13 in Yakou. The object is subject to clamping forces F and frictional forces equal to the coefficient of friction ($\mu$) between the finger and object surfaces times the clamping force. These forces are applied by the fingers and create an out-of-plane moment. Using Yakou's design the object will fail to be held if the ratio of d1 over d2 (i.e. the object's height over it's width) exceeds the coefficient of friction. If the fingers and object are made of steel, which is the typical situation, this ratio will be limited to approximately 0.2 if both surfaces are dry, and to approximately 0.05 if either is wet or oily. As a result, the device of Yakou is limited to holding fairly flat objects. It can also only hold an object subjected to out-of-plane forces less than twice the coefficient of friction times the clamping force.

The fingers described in the instant invention employ non-clamp means such as knurling or V grooves in place of the plain cylinders employed by the device of Yakou. Although grooves provided at the ends of fingers are shown by Hearne in U.S. Pat. No. 5,566,466, Hearne's design is limited to grasping flat objects. Notwithstanding, there is a significant unexpected advantage in providing fingers having multiple degrees of freedom having some sort of grooved means or no-clamp means at or near their ends. As shown in FIG. 12, one embodiment would be knurl the surfaces of the fingers in the general area where they would come in contact with an object, labelled K in the figure. The teeth of the knurled surface provide a much stronger constraint than that provided by frictional contact. A further embodiment of non-clamping means, namely the use of circumferential V grooves applied to the fingers' surfaces, is shown in FIG. 13, labelled G. It may be easily shown that the object will fail to be held if the ratio of d1 over d2 (i.e. the object's height over it's width) exceeds the sum of the coefficient of friction and the tangent of the groove angle $\alpha$. For a typical groove angle of 45°, this ratio will be 1.2 (assuming dry steel on steel contact), so that objects ranging from completely flat to those which are more tall than wide may be held by the new invention. This is a substantial improvement over that of Yakou. Assuming the object can be held, the use of grooves allows theoretically infinite out-of-plane forces and moments to be resisted, limited only by the strength of the fingers, actuators, and the gripper's frame. Furthermore, this does not require the application of large clamping forces so that thin or fragile objects may be held. The surfaces of the object also need not be either parallel with the finger as with the device of Yakou or perpendicular to the finger as with the devices of Hearne and of Reising et al. allowing objects with more complex curved surfaces, for example as shown in FIG. 1 of the instant application, to be held.

Although some of the aforementioned prior art grippers may adequately provide their intended function, there is a need for a programmable gripper for accurately fixturing three-dimensional sheet metal parts of various shapes.

For example, in the automotive and aircraft industry, sheet metal parts must be fixtured during the assembly of vehicle bodies. Furthermore, it is preferred to have a single gripper that can easily be programmed to fixture parts having a plurality of different shapes and sizes.

It is therefore an object of this invention to provide a multi-degree-of-freedom gripper for use in robotic fixtureless assembly.

It is a further object of this invention to provide a gripper for fixturing a plurality of different sheet metal parts by only changing computer controlled axes.

It is a further object of the invention to provide a gripper that can grip in the absence of a robot.

SUMMARY OF THE INVENTION

In accordance with the invention, a gripper is provided for holding an object having at least an edge, the gripper comprising:

at least three rigid non-jointed fingers each being relatively movable and each having three degrees of controllable movement, at least one of the fingers having at least a groove for engaging said at least said edge; and, drive means for relatively moving the fingers.

In accordance with the invention, a gripper for holding a sheet of material having slots defined therein by walls of a thickness t is provided, the gripper comprising:

at least three relatively movable grasping fingers, each finger being controllably movable in three orthogonal directions, the fingers each being sized to fit within one of the slots and having a groove of a width of at least t for sliding along a respective slot wall and for preventing said sheet from slipping or moving relative to the fingers when the fingers are placed in the slots and moved as far apart as possible or as close to one another as possible within the slots; and, drive means for moving the fingers.

In accordance with the invention there is further provided, a gripper for holding a sheet of material having slots defined therein by walls of a thickness t, the gripper comprising:

at least three relatively movable grasping fingers, each finger being controllably movable in three orthogonal directions, the fingers each being sized to fit within one of the slots and having a groove of a width of at least t for sliding along a respective slot wall and for preventing said sheet from slipping or moving relative to the fingers when the fingers are placed in the slots and moved as far apart as possible or as close to one another as possible within the slots; and, drive means for moving the fingers.

In accordance with the invention there is provided, a gripper for holding a sheet of material having at least an opening defined therein, comprising:

at least three controllably movable grasping fingers, at least one of the fingers being sized to fit within the at least one opening, each of the at least three fingers having means for engaging the sheet and for preventing the sheet from substantially slipping or moving relative to the fingers when the fingers have been controllably moved to grasp the sheet in a kinematically locking manner independent of friction forces; and, drive means for moving the each of the fingers in at least one of the first and second directions.

In accordance with another aspect of the invention, there is further provided, a method of gripping a sheet of material having at least an opening defined therein, comprising the steps of:

providing three fingers each of which is movable in three orthogonal directions, at least one finger having a groove for being guided along a wall defining the opening;

placing at least one finger in the opening, the fingers being spaced from one another; and, moving the fingers toward or away from one another until movement is ceased such that the object is kinematically securely held independence of frictional forces, the fingers forming 3 vertices of a triangle.

In accordance with the invention, there is provided a method for holding and moving an object having at least an edge comprising the steps of:

providing a gripper supported by an arm, the gripper having at least three rigid non-jointed fingers each being relatively movable in three orthogonal directions, at least one of the fingers having at least a groove for engaging said at least said edge; and, providing drive means for relatively moving the fingers, placing the fingers about edges of the object and grasping the object such that the at least a groove engages the object and the object is kinematcially held;

moving the object from a first position to a second different position without moving the arm.

Since friction is not used in the fixturing of parts, oily objects that are difficult to pick up with conventional parallel jaw or vacuum cup grippers can be easily manipulated and fixtured.

The invention further lends itself to fixturing parts accurately even when their initial placement is inaccurate.

Advantageously, and surprisingly, this invention provides the ability to grasp objects having a plurality of different shapes wherein a plurality of fingers having grooved ends, each finger having three degrees of movement grasps and kinematically locks the object essentially without frictional forces being required.

BRIEF DESCRIPTION OF THE DRAWINGS

Exemplary embodiments of the invention will now be described in conjunction with the drawings in which:

FIGS. 7a and b are kinematic diagrams of a single finger mechanism;

FIGS. 10a and 10b are kinematic diagrams of a single finger mechanism;

FIG. 11b is a side view of the FIG. 11a;

DETAILED DESCRIPTION OF THE INVENTION

Figure 4:
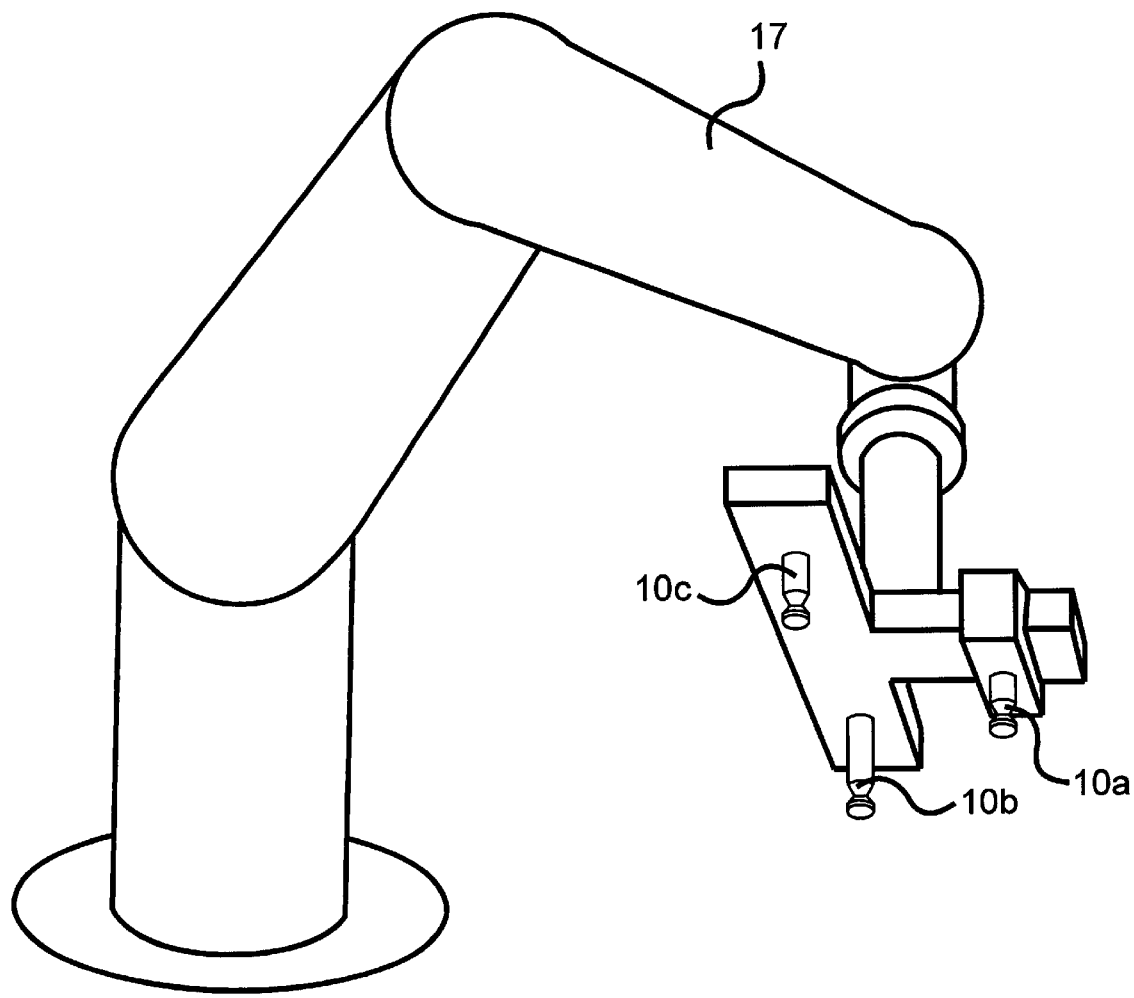
FIG. 4 is a is a pictorial view of a gripper mounted on industrial robot arm.

An exemplary gripper of the invention is a mechanical device comprising three fingers 10a, 10b, and 10c, intended to be attached to the end of an arm 17 of an industrial robot as shown in FIG. 4. A sheet of material 14 may be a thick or thin sheet of rigid or non-rigid material, for example, a thick or thin metal sheet, or alternatively a sheet of plastic. The sheet material may be planar or of a more complex shape such as a molded autobody part such as a car door.

Figure 1A:
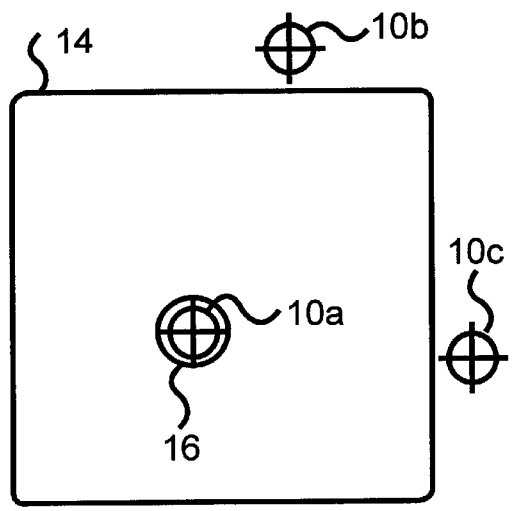
FIGS. 1a and 1b are top and side views respectively of a sheet metal part having a gripper finger located within a slot of the metal part wherein two other fingers are disposed about the periphery of the part shown in a non-fixtured position.
Figure 1B:
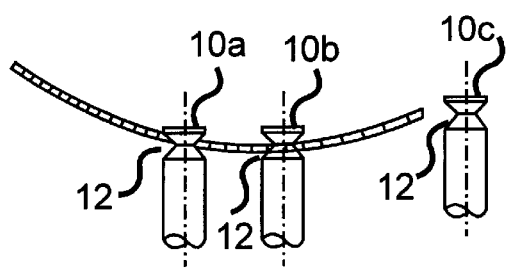
Figure 6:
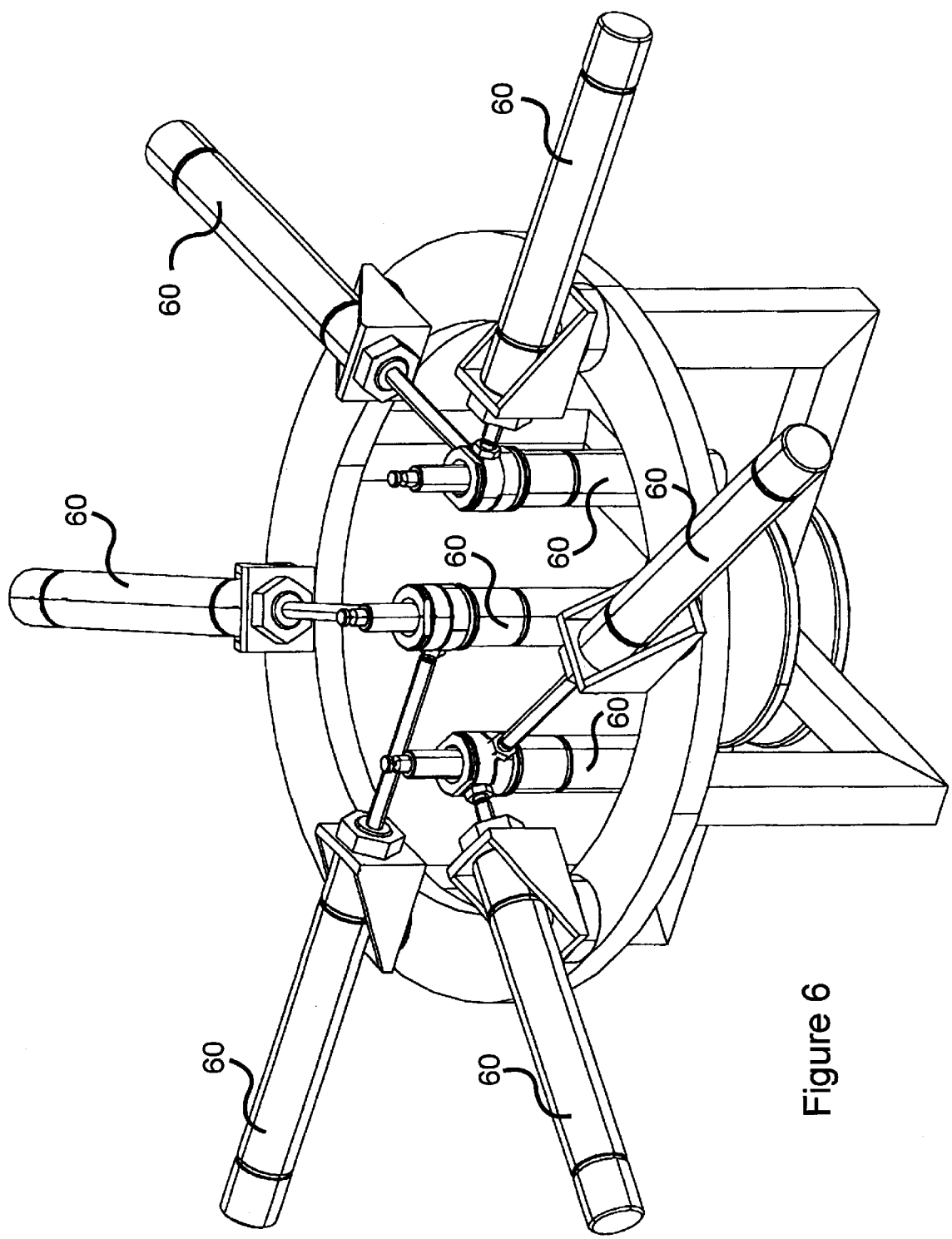
FIG. 6 is a perspective view of another embodiment of a robotic gripper having 3 movable fingers, in accordance with the invention.

Referring now to FIGS. 1a and 1b, a workpiece in the form of a sheet of steel 14 is shown in an unfixtured position. Three fingers attached to and controlled by actuating means (similar to those shown in FIG. 6) are positioned about the workpiece 14 such that one finger is placed within an opening in the form of a slot 16 and the other fingers are disposed about outside edges of the workpiece 14. In this configuration, the fingers are ready to be moved toward one another. This can be accomplished by several methods. For example, the one finger disposed within the slot 16 can be moved toward the other two fingers, which may be fixed and non-movable. Alternatively, only two fingers may be movable or all three fingers may be movable and moved in toward one another (as shown in FIG. 6).

Figure 1C:
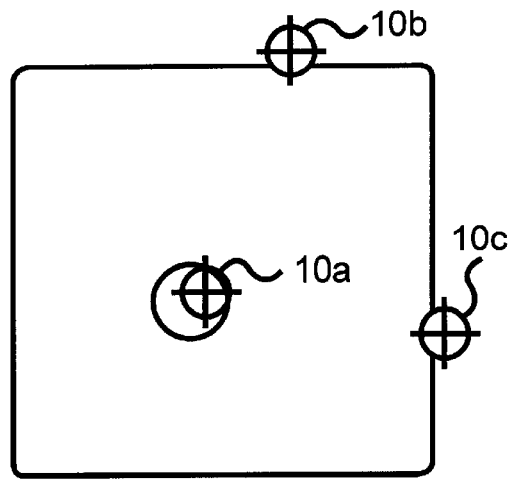
FIGS. 1c and 1d are top and side views respectively of the sheet metal part shown in FIGS. 1a and 1b, having a gripper finger located within a slot of the metal part wherein two other fingers are disposed at the periphery of the part shown in a fixtured position.
Figure 1D:
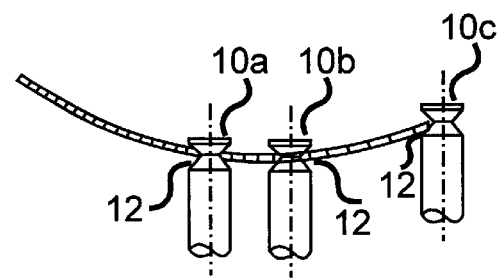
Figure 12:
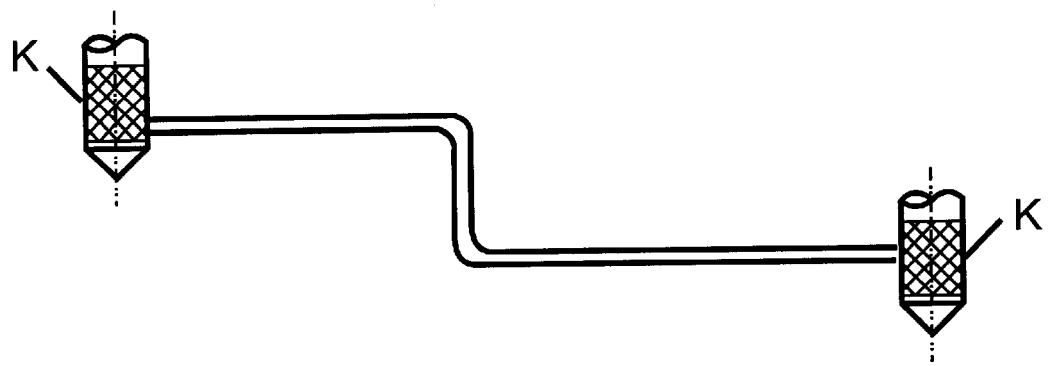
FIG. 12 is a side view of a preferred embodiment wherein the fingers are knurled having small grooves defined therein; and, FIG. 13 is a side view of an alternative embodiment wherein the fingers have a circumferential groove defined therein.
Figure 13:
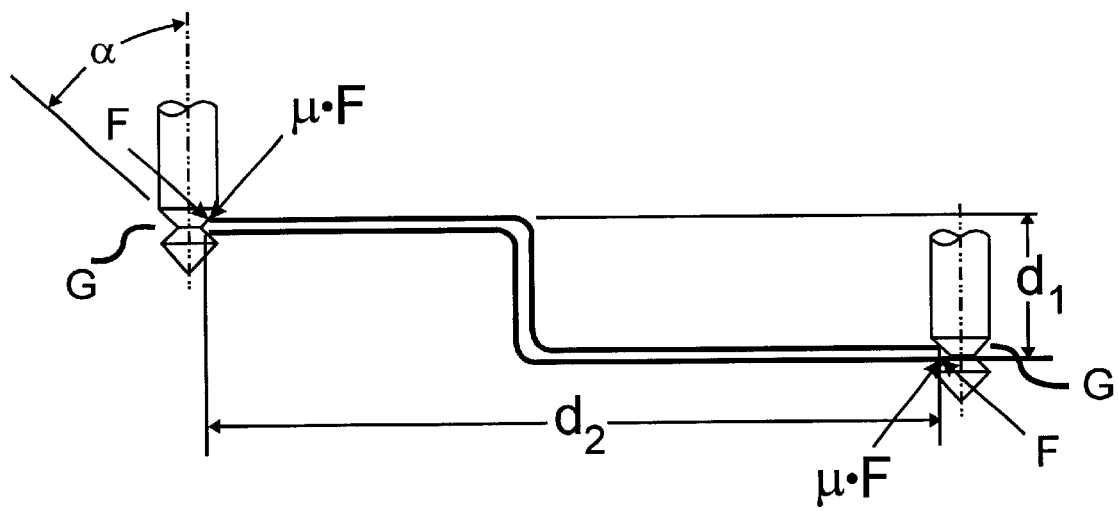

As can be seen in FIGS. 1b and 1d, the fingers are equipped with means for preventing the workpiece during fixturing and when fixtured from moving or slipping, in the form of guide means or tracking means 12, hereafter termed a groove or grooves. In a preferred embodiment, these means 12 are in the form of circumferential V-grooves around the periphery of each finger. However, a circumferential groove may also be provided around the periphery of a finger that has a somewhat square cross section, thus the term circumferential need not be limited to following a circular path. FIG. 12 shows an alternative embodiment wherein the means 12 are in the form of knurling "k" or equivalent means.

In FIGS. 1c and 1d, the fingers are shown in an inwardmost position wherein the fingers have been moved relatively toward one another until the grooves all tightly accommodate edges of the sheet of material. By providing a slot or opening that is substantially larger than the cross section of a finger, more tolerance is allowed for in aligning and placing the finger within the slot. By the same token, providing a groove 12 that is larger than the thickness of the sheet material allows an object to be located and grasped allowing for further robot error. The groove should be sized to accommodate a range of customary sheet thicknesses. The object shown being grasped in FIGS. 1b and 1d is not planar and providing fingers that can each move with three degrees of freedom and that have a groove at or near an end thereof, allows heavy non-planar objects to be held without the application of force; this arrangement allows the object to be kinematically locked. Kinematics is a branch of mechanics describing motion of bodies without using force or mass.

Figure 2A:
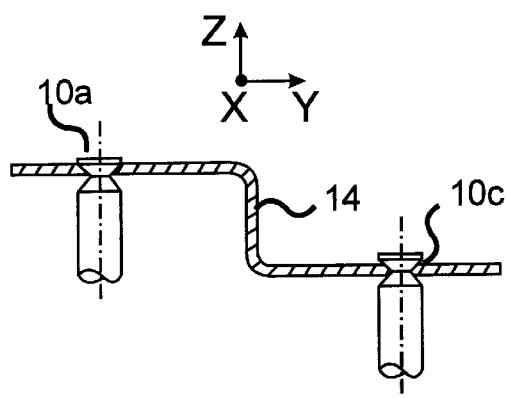
FIG. 2a is a side view taken partly in cross section through the line A—A of the sheet metal part shown in FIG. 2b.
Figure 2B:
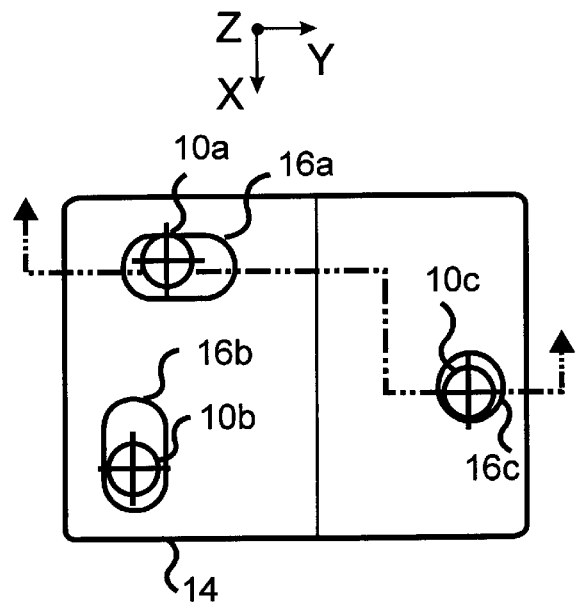
FIG. 2b is a top view of a sheet metal part having gripper fingers located within three slots of the sheet metal part shown in a non-fixtured position.
Figure 2C:
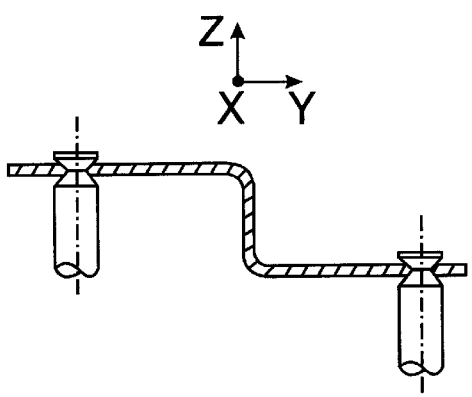
FIGS. 2c and 2d are side and top views of the sheet metal part shown in FIGS. 2a and 2b, wherein the fingers are at outer ends of the slots of the sheet metal part in a fixtured position.

FIGS. 2a and 2b illustrate three fingers 10a, 10b, and 10c which are placed within slots 16a, 16b, and 16c of a workpiece 14. After the fingers are located within the slots they are guided along the slot walls by having their grooves 12 track along the slot walls to an end position as shown in FIGS. 2c and 2d, wherein the fingers have been moved apart until their movement is limited by slot walls or edges.

Figure 2D:
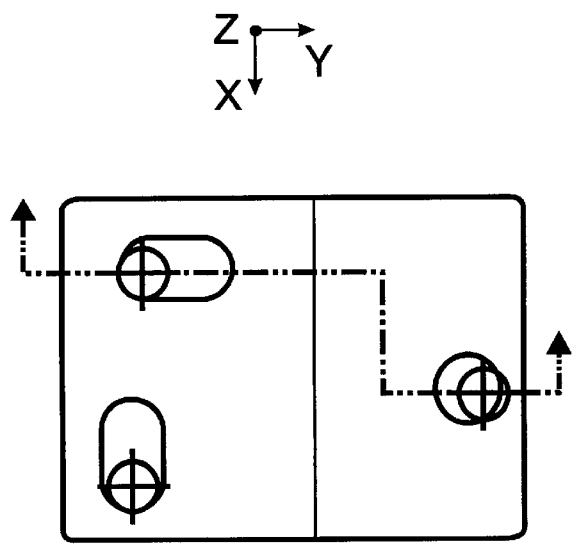
Figure 3A:
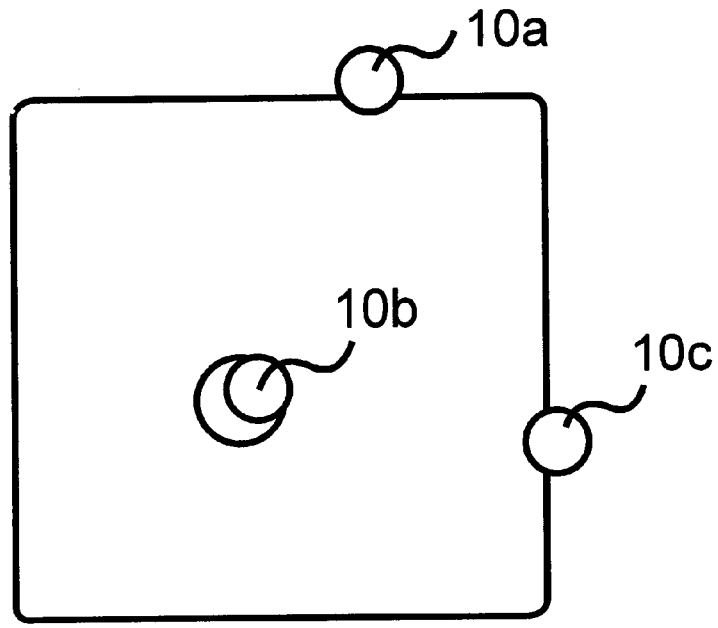
FIGS. 3a to 3g are plan views of sheets of metal shown in a plurality of fixtured positions.
Figure 3B:
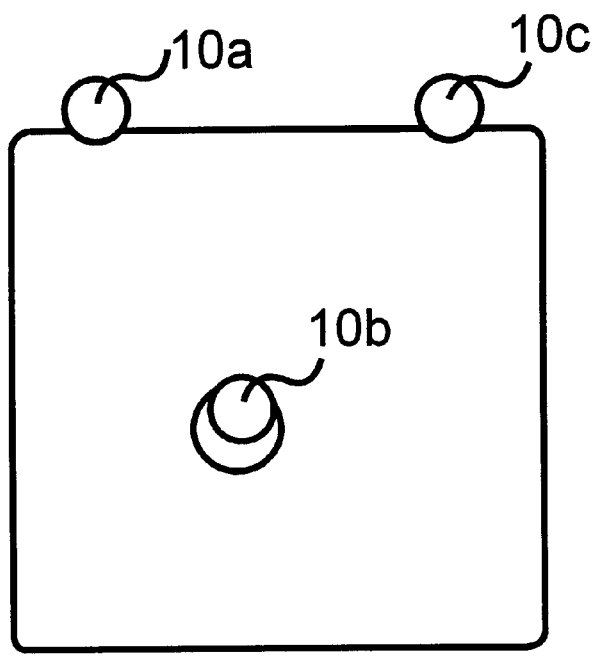
Figure 3C:
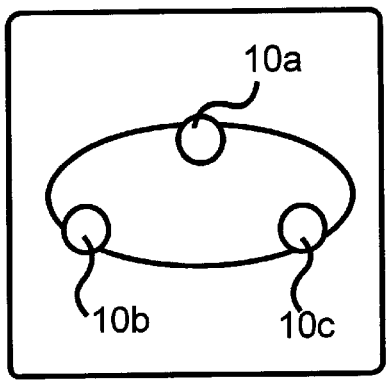
Figure 3D:
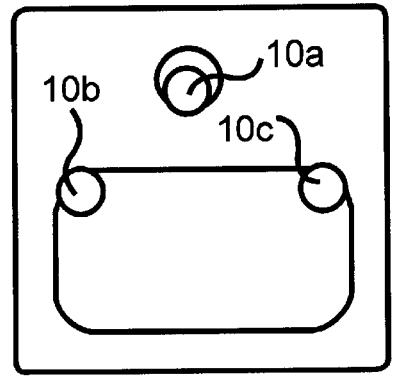
Figure 3E:
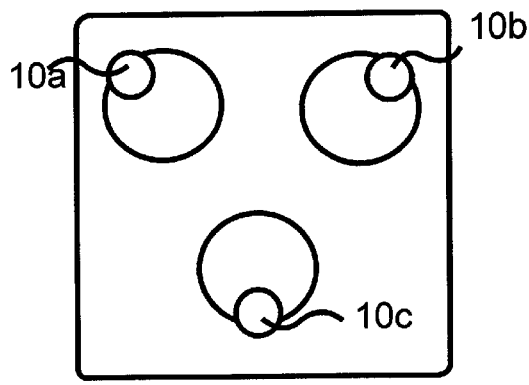
Figure 3F:
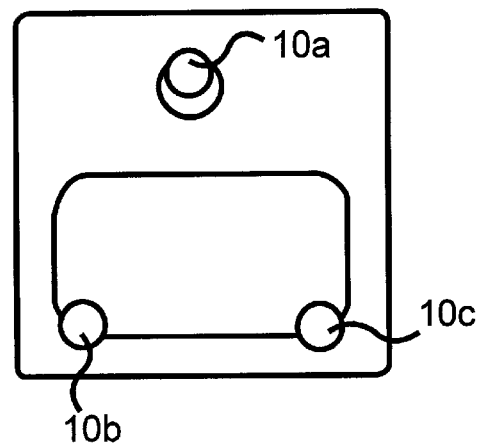
Figure 3G:
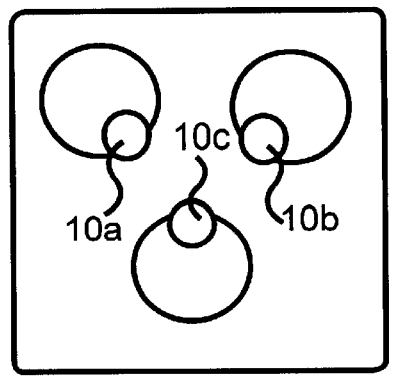

As is apparent from FIGS. 2d and 1c, or viewing FIGS. 3c to 3g, a workpiece may be fixtured by placing fingers into respective adjacent slots and bringing the fingers together in an inward direction as far as possible or alternatively by bringing the fingers apart as far as possible while maintaining the fingers within the slots. Advantageously, by bringing the fingers apart while in the slots allows a thin sheet material such as a plastic film to be fixtured without it collapsing as it would if an inward force was brought to bear on the sheet.

The provision of a V-shaped groove conveniently allows a range of thicknesses of materials to be fixtured.

Turning now to FIGS. 3a to 3g, the programmable gripper comprising 3 fingers 10a, 10b, and 10c as described heretofore, is shown as being capable of fixturing a plurality of different configurations. Since the fingers and the grooves thereon are sized to receive a plurality of thicknesses of sheet material, and since the openings or slots can be of a variety of shapes and sizes, a change in the program controlling the robot's fingers is all that is necessary in conforming to a different workpiece. For example, the robot must know the approximate location of the workpiece and have some information relating to the shape and location of the slots.

In the prior art references of Reising et al., Berg, Link et al., and Sakimori et al. (U.S. Pat. No. 4,790,709) fingers are placed together inside one hole to hold an object. The holes are also circular or cylindrical. Hence, contact friction forces are all that is preventing the object from rotating in-plane (i.e. in the plane of the fingertips). However, in the embodiment shown for example in FIG. 3c, fingers are disposed in a noncircular hole or in any of the other ways shown in FIGS. 3a to 3g and the object is locked in place kinematically, independent of the clamping force as long as it is greater than zero. Friction is not required, and all forces and moments can be resisted, in-plane and out-of-plane with the only limitation being the strength of the gripper.

Figure 5A:
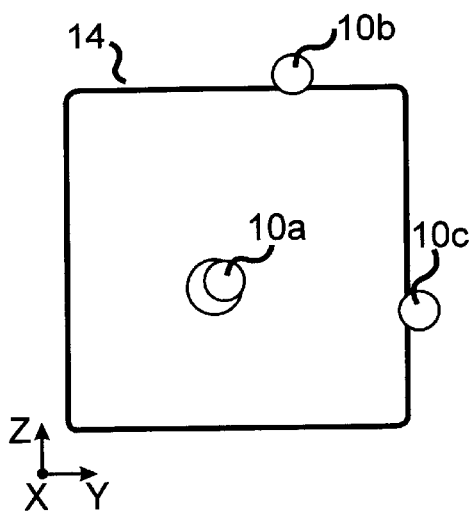
FIGS. 5a, 5c and 5b, 5d show views of an object held kinematically in a first position, and views of the same object held is a second position respectively.
Figure 5B:
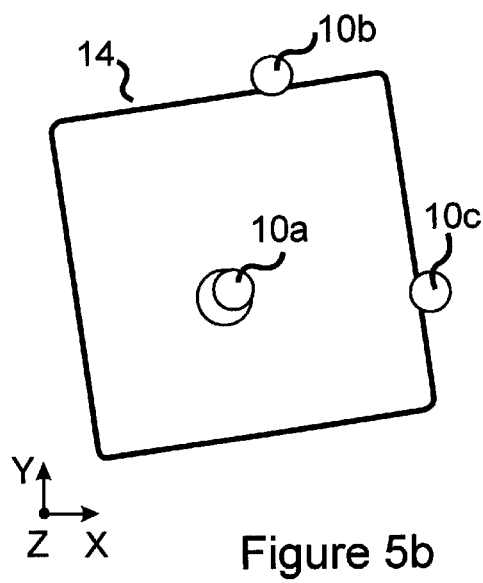
Figure 5C:
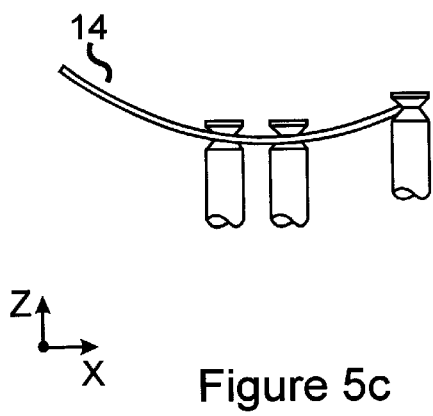
Figure 5D:
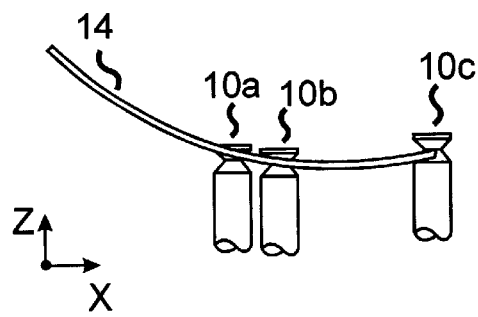

FIGS. 5a and 5c are different views of a same instance or pose wherein a gripper in accordance with the invention, having non-jointed fingers 10a, 10b, and 10c, is holding a curved sheet metal part 14. FIGS. 5b and 5d show a different instance or pose wherein the fingers are grasping essentially the same locations on the sheet metal part 14; however, the object is oriented differently by the gripper. Surprisingly, this can be achieved without movement of a robot arm or wrist supporting the gripper. In fact, this can be achieved with the inventive gripper even if the gripper is fixed to a non-movable support. Thus, holding a part with three fingers, each with three orthogonal degrees of movement, allows the gripper to manipulate the position and lo orientation of the sheet 14 in 3D space without letting go of it. That is, the gripper can move the sheet 14 in three orthogonal directions X, Y and Z and rotate it about the X, Y and Z axes. This cannot be done with a gripper fixedly connected to a non-movable support with less than 3 degrees of mobility per finger. Practically, this provides a way to make fine adjustments in order to line the parts up during an assembly process.

A preferred arrangement is shown in FIG. 6, wherein the gripper can move each finger with 3 degrees of mobility (X, Y, and Z) thereby providing 9 degrees of mobility. Each of the 9 cylinders 60 shown are linear actuators. This arrangement is capable of picking up and fixturing a greater variety of shapes.

Figure 8A:
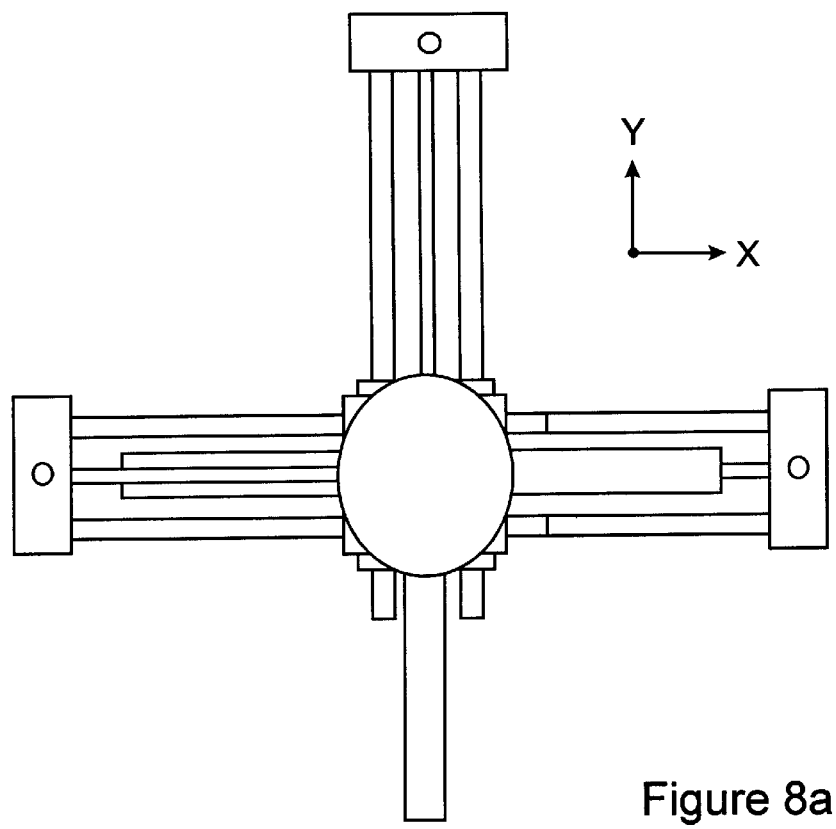
FIGS. 8a and 8b are two views of alternative embodiments of actuators for controlling three fingers.
Figure 8B:
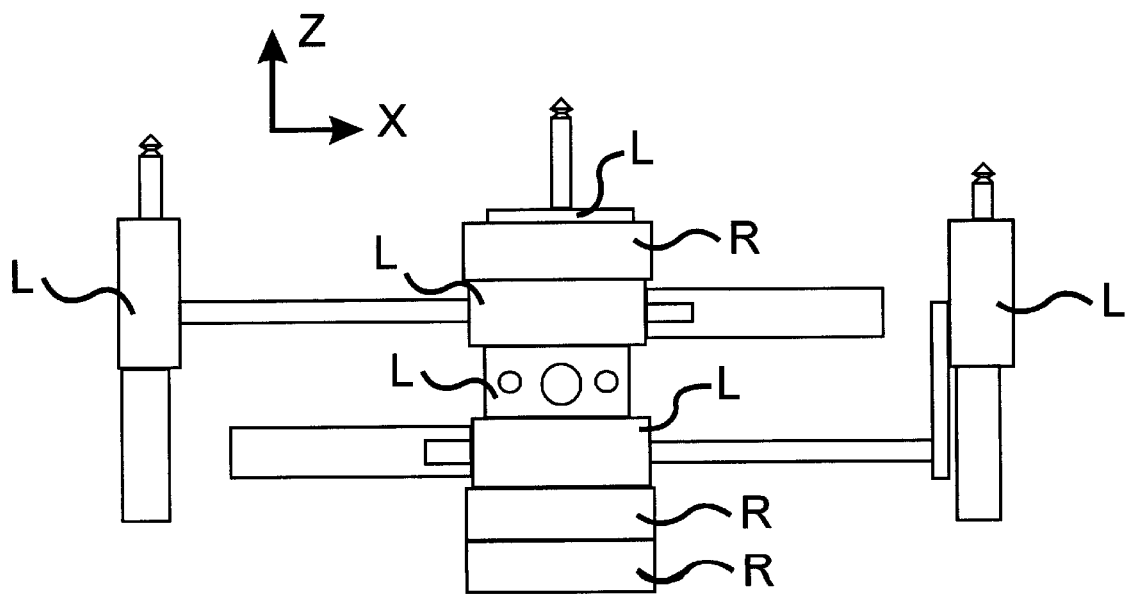
Figure 9:
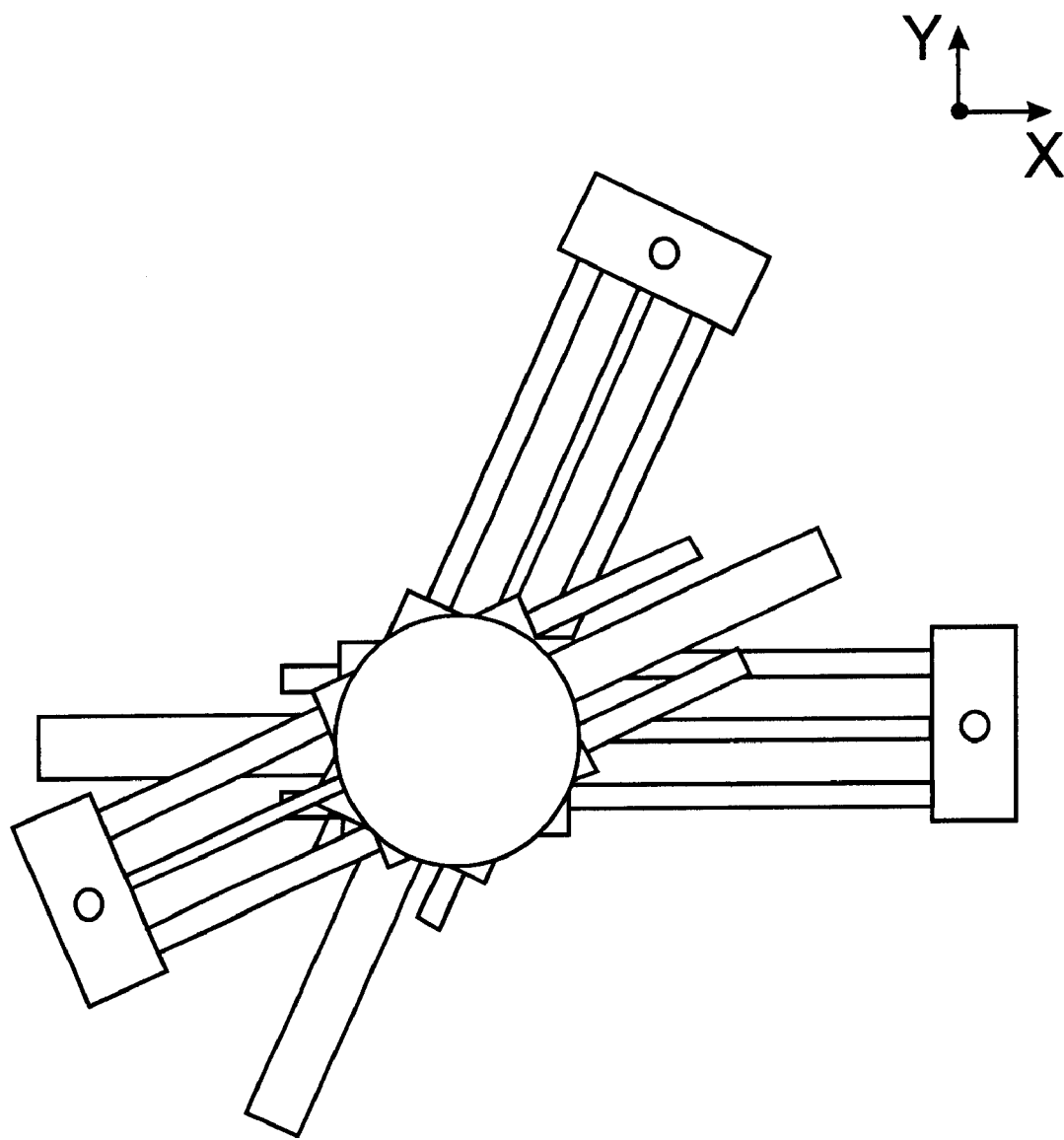
FIG. 9 is a top view of the system shown in FIGS. 8a and 8b.
Figure 11A:
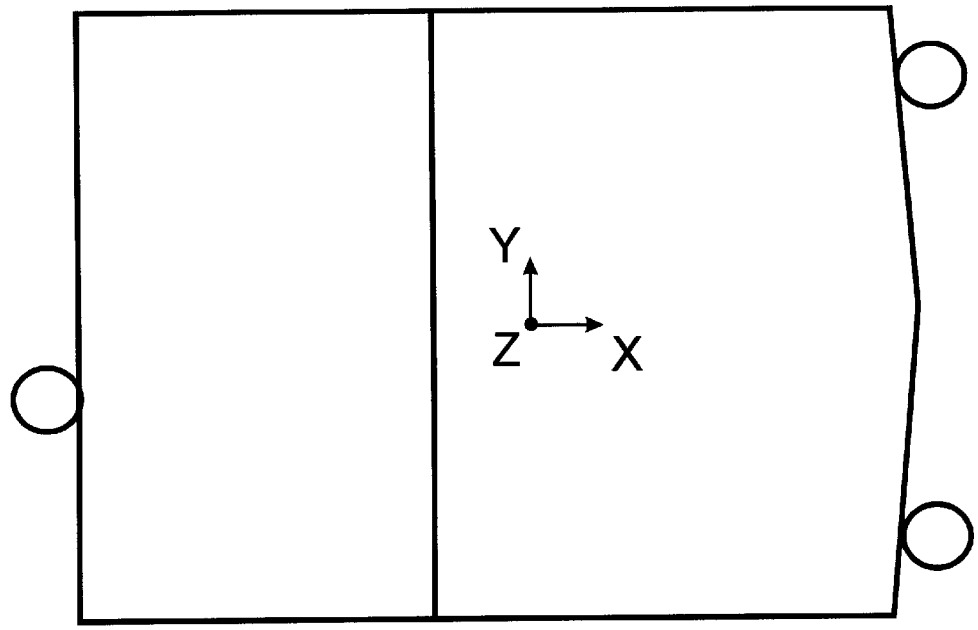
FIG. 11a is a top view of three fingers grasping a sheet of material having a bend therein.
Figure 11B:
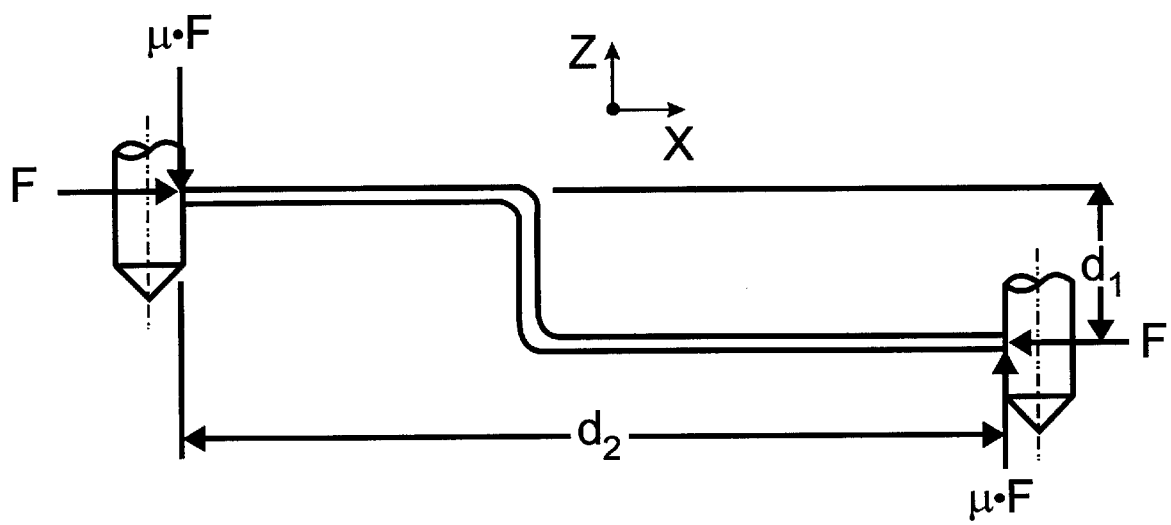

The operation of the embodiment shown in FIG. 6 is described in reference to the kinematic diagram of a single finger mechanism shown in FIG. 7. Linear actuator L1 is pin jointed to the gripper's frame at point A and pin jointed to linear actuator L2 at point B. Linear actuator L2 is pin jointed to L1 at point B and pin jointed to the frame at point C. Controlled movement of the fingertip in the X and Y directions is provided through the actuation of L1 and L2. Linear actuator L3 is attached such that it is concentric with point B, and parallel to the Z direction. Controlled fingertip movement in the Z direction is provided by linear actuator L3. This embodiment has the advantage that actuators L1 and L2 along with the gripper's frame form a closed kinematic chain which is mechanically rigid in comparison to open kinematic chains. A further embodiment is shown in FIGS. 8, 9, and 10. Again, each finger is provided with three degrees of mobility (X, Y and Z). This is achieved through the arrangement of six linear actuators L and three rotary actuators R shown in FIG. 8b. The rotary actuators are attached such that the linear actuators may be rotated in the XY plane independent of each other and of the robot carrying the gripper, as shown in FIG. 9. A kinematic diagram of a single finger mechanism is shown in FIG. 10. Controlled fingertip movement in the X and Y directions is provided by the revolute actuator R in combination with the linear actuator L1. Controlled fingertip movement in the Z direction is provided by actuator L2. This embodiment has the advantage over that of FIG. 6 in that it is easier to manufacture and assemble. However, since it utilizes an open kinematic chain it will lack the rigidity provided by the structure of the embodiment of FIG. 6.

It will be understood that the embodiments described and illustrated above are merely exemplary. It is possible and may indeed be advisable or even necessary to provide a gripper with more than three fingers if the material, as mentioned hereinabove, is relatively thin or flimsy and needs to be stretched at more than three spots.

It will also be appreciated that the definition of a "finger" is not limiting to a specific shape nor length, as long as the finger is dimensioned to fit into a slot, opening or hole in the material to be fixured, and as long as the finger has a sheet-fixing means thereon. The fixing means for engaging the sheet need not be disposed at the end of the finger. It will be noted that for the purpose of the invention, it is only the part of the finger with the groove thereon that is of importance in locating and fixturing the sheet. Accordingly, if one of the fingers is moved in a direction "z" as shown in FIG. 2a and 2b, the sheet 14 will be displaced and the relative distance between the grooves 10a, 10b and 10c will change although this will not show in the plan view of FIG. 2b. Still, this will satisfy the definition of relative movement of the fingers as used throughout the specification.

It will also be appreciated that the fingers may be disposed and moved (or relatively moved) not only in a parallel arrangement as illustrated (i.e., with their longitudinal axes parallel at all times) but at an angle relative to each other, for instance to accommodate a curvature of the material. The definition "movable" is intended to encompass such embodiments.

It is a feature and an advantage of the invention that the sheet of material may be held and immobilized in a predetermined position without clamping the surface of the sheet or imparting a sheet-bending force transversely to its surface.

Of course, numerous other embodiments may be envisaged, without departing from the spirit and scope of the invention.

The invention can also be applied to a sheet which has no openings. The at least three fingers are positioned to engage the outside edge of the sheet and moved towards each other thus gripping the sheet. This assumes, of course, that the sheet has a sufficient rigidity.

What is claimed is:

1. A gripper for holding in place an object having at least an edge, the gripper comprising:
    at least three rigid non-jointed fingers, each finger being relatively movable to another finger in three orthogonal directions in a frame of reference relative to a position of the another finger, at least one of the fingers having at least a groove for engaging said at least said edge; and, drive means for moving the fingers relatively to each other.

2. A gripper as defined in claim 1, wherein the drive means comprise a plurality of actuators, the plurality of actuators for independently moving each of the at least three fingers in three orthogonal directions.

3. A gripper as defined in claim 2, wherein the fingers are sized to grasp a sheet of material defining an outside edge and having at least one opening therein, at least one of said fingers being sized to fit within said at least one opening, each of the fingers having a groove for preventing a grasped sheet from slipping, the fingers for providing kinematic locking of the object.

4. The gripper as defined in claim 3, wherein the groove for preventing said sheet from slipping comprises means for tracking along an edge of said at least one opening as the fingers are relatively moved.

5. The gripper as defined in claim 4, wherein the means for tracking comprises a circumferential groove near the tip of one of the fingers.

6. The gripper as defined in claim 4, wherein the circumferential groove is a tapered V-groove.

7. The gripper as defined in claim 3, wherein the at least one of the grooves is tapered to receive a range of edge thicknesses.

8. A gripper as defined in claim 1 comprising actuators for moving each of the at least three fingers, independently in three orthogonal directions.

9. A gripper for holding a sheet of material having slots defined therein by walls of a thickness t, the gripper comprising:

at least three grasping fingers relatively movable, each finger being controllably movable relative to at least another of the at least three grasping fingers in three orthogonal directions in a frame of reference relative to a position of the another finger, the fingers each being sized to fit within one of the slots and having a groove of a width of at least t for sliding along a respective slot wall and for preventing said sheet from slipping or moving relative to the fingers when the fingers are placed in the slots and moved as far apart as possible or as close to one another as possible within the slots; and, drive means for moving the fingers.

10. A gripper for holding a sheet of material having at least an opening defined therein, comprising:

at least three controllably movable grasping fingers, each finger being movable relative to at least another of the at least three grasping fingers in three orthogonal directions in a frame of reference relative to a position of the another finger, at least one of the fingers being sized to fit within the at least one opening, each of the at least three fingers having means for engaging the sheet and for preventing the sheet from substantially slipping or moving relative to the fingers when the fingers have been controllably moved to kinematically grasp the sheet in a locking manner; and, drive means for moving the fingers.

11. The gripper as defined in claim 10, wherein the means for engaging the sheet and for preventing the sheet from substantially slipping is a groove within each of the fingers, said groove sized to accommodate the edge of the sheet.

12. The gripper as defined in claim 11, wherein the groove is substantially larger than the thickness of the edge of the sheet.

13. A method of gripping a sheet of material having at least an opening defined therein, comprising the steps of:

providing three non-jointed fingers each of which is relatively movable to another finger from the three non-jointed fingers via actuators in each of three orthogonal directions in a frame of reference relative to a position of the another finger, at least one finger having a groove for being guided along a wall defining the opening;

placing at least one finger in the opening, the fingers being spaced from one another; and, moving the fingers toward or away from one another until movement is ceased such that the object is kinematically securely held, the fingers forming 3 vertices of a triangle.

14. A method of gripping a sheet of material having at least an opening defined therein, comprising the steps of:

providing three non-jointed fingers each of which is relatively movable to another of the three non-jointed fingers in a frame of reference relative to a position of the another via actuators in three orthogonal directions, at least one finger having a groove for being guided along a wall defining the opening;

placing at least one finger in the opening, the fingers being spaced from one another; and, moving the fingers toward or away from one another until movement is ceased such that the object is kinematically securely held the fingers forming 3 vertices of a triangle wherein the groove is substantially larger than the thickness of the sheet material, allowing for error in locating the sheet.

15. A method for holding and moving an object having at least an edge comprising the steps of:

providing a gripper supported by a supporting member, the gripper having at least three rigid non-jointed fingers, each finger being relatively movable to another of the three rigid non-jointed fingers in three orthogonal directions in a frame of reference relative to a position of the another, at least one of the fingers having at least a groove for engaging said at least said edge; and, providing drive means for relatively moving the fingers, placing the fingers about edges of the object and grasping the object such that the at least a groove engages the object and the object is kinematically held;

moving the object from a first position to a second different position without moving the supporting member.

16. A method as defined in claim 15, wherein the step of moving the object from a first position to a second different position is performed while each of the fingers maintain contact with the object at a location substantially identical between the contact with the object in the first position and the contact of the object in the second different position.

* * * * *